US006438580B1

(12) United States Patent
Mears et al.

(10) Patent No.: US 6,438,580 B1
(45) Date of Patent: *Aug. 20, 2002

(54) SYSTEM AND METHOD FOR AN INTERACTIVE KNOWLEDGEBASE

(75) Inventors: Randall F. Mears, Plano; Jaye D. Hicks, Frisco, both of TX (US)

(73) Assignee: Electronic Data Systems Corporation, Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 75 days.

(21) Appl. No.: 09/050,712

(22) Filed: Mar. 30, 1998

(51) Int. Cl.$^7$ .......................... G06F 13/38; G06F 15/17
(52) U.S. Cl. .......................... 709/204; 709/206; 707/50
(58) Field of Search .................................. 709/203–207, 709/303–305; 706/60, 61, 46, 47; 707/102–103; 705/1, 26, 27

(56) References Cited

U.S. PATENT DOCUMENTS

| | | | | |
|---|---|---|---|---|
| 5,596,994 A | * | 1/1997 | Bro ............................. 600/545 |
| 5,619,648 A | * | 4/1997 | Canale et al. ................ 709/206 |
| 5,673,404 A | * | 9/1997 | Cousins et al. ............. 345/772 |
| 5,774,670 A | * | 6/1998 | Montulli ..................... 709/227 |
| 5,787,234 A | * | 7/1998 | Molloy ......................... 706/46 |
| 5,862,223 A | * | 1/1999 | Walker et al. ................ 705/50 |
| 5,872,924 A | * | 2/1999 | Nakayama et al. ......... 709/205 |
| 5,879,163 A | * | 3/1999 | Brown et al. ................ 434/236 |
| 5,897,670 A | * | 4/1999 | Nielsen ....................... 345/334 |
| 5,909,679 A | * | 6/1999 | Hall .............................. 707/4 |
| 5,930,471 A | * | 7/1999 | Milewski et al. ........... 709/204 |
| 5,931,907 A | * | 8/1999 | Davies et al. ............... 709/218 |
| 5,941,947 A | * | 8/1999 | Brown et al. ................ 709/225 |
| 5,948,054 A | * | 9/1999 | Nielsen ....................... 709/200 |
| 5,963,951 A | * | 10/1999 | Collins ....................... 707/102 |
| 5,974,446 A | * | 10/1999 | Sonnenreich et al. ....... 709/204 |
| 6,029,192 A | * | 2/2000 | Hill et al. .................... 709/206 |
| 6,094,675 A | * | 7/2000 | Sunaga et al. .............. 709/204 |
| 6,189,029 B1 | * | 2/2001 | Fuerst ......................... 709/217 |
| 6,230,185 B1 | * | 5/2001 | Salas et al. ................. 709/205 |

FOREIGN PATENT DOCUMENTS

JP        10-28135    *   1/1998   ........... H04L/12/54

OTHER PUBLICATIONS

McCabe et al., "Seek pofessional help!", Aug. 1, 1995, online access, v10 n8 pp. 49–51 (3).*

Moore, "Internet access Resources: Searching, Newsgroups, Presentation Software, K–12 Reosurces, Blocking Software", IEEE, 1996 proceedings, pp. 568–571 (4).*

(List continued on next page.)

Primary Examiner—Robert B. Harrell
Assistant Examiner—Bunjob Jaroenchonwanit
(74) Attorney, Agent, or Firm—Baker Botts, LLP; L. Joy Griebenow

(57) ABSTRACT

An interactive knowledgebase (48) system is provided. The system comprises a server (14) and a client (12). The server (14) is operable to retrieve a plurality of informational pages with each informational page containing items and links to items. The server (14) is further operable to maintain a directory (172) of the items organized by category. The client (12) is coupled to the server (14) and operable to display the directory (172) in a first frame of a web browser (32). The client (12) is further operable to request information pages from the server (14) and display the information pages in a second frame of the web browser (32). A user at the client (12) can participate in an exchange of items and comments regarding items with other users of the interactive knowledgebase (48).

34 Claims, 12 Drawing Sheets

OTHER PUBLICATIONS

Banks et al. "Information resources on the Internet", 6/95, Engineering Science and Education Journal, pp. 123–130 (8).*

Beckett, "The Internet phenomenon", 6/96, Engineering Science and Education Journal, pp. 102–104 (3).*

Proceedings of the 23$^{rd}$ Euromicro Conference: New Frontiers of Information Technology (Cat. No. 97TB100167), Budapest, Hungary, Sep. 1–4, pp. 72–77, Smeaton et al., entitled "Adapting the infrastructure provided by the World Web for educational purposes".

Proceedings of the ACM Conference on Computer–Supported Cooperative Work (CSCW '96), Nov. 1996. pp. 97–105, Ackermann et al., Entitled "Answer Garden 2: Merging Orgnaizational Memory with Collaborative Help".

Proceedings of the Twenty–Eighth Hawaii Internatioal Conference on System Sciences, Wailea, HI, USA, Jan., 3–6, 1995, pp. 323–332, Ackerman et al., entitled "Memory in the Small: An Application to Provide Task–Based Organizational Memory for a Scientific Community".

Conference on Office Information Systems, Cambridge, MA, USA, Apr. 25–27, 1990, vol. 11, No. 2–3, pp. 31–39, Ackerman et al., entitled "Answer Garden: A Tool for Growing Organizational Memory".

Proceedings of the Thirteenth National Conference on Artificial Intelligence, Portland, OR, 1996, pp. 3–9, Kautz et al., entitled "Agent Amplified Communication".

* cited by examiner

FIG. 7b  200

| Current Profile for hzhbn9: | |
|---|---|
| Street Address: | 5400 Legacy Dr. |
| | H3-5D-66 |
| City: | Plano |
| State/Province: | TX |
| Zip/Postal Code: | 75024 |
| Country: | United States ▼ |
| Primary Language: | English (United States) ▼ |

[ OK ]   [ Cancel ]

FIG. 7c  210

Current Profile for hzhbn9:

Home page:
[_____] ─212

Keywords: use ";" to separate keywords
```
Advanced Technology; CTO; Windows;
Windows NT; NT; Windows CE; WinCE;
Internet; CGI; Architecture; Technology
```
─214

Font size: (For the category list)
[ Small ▼ ]

[ OK ]   [ Cancel ]

FIG. 7e  _230_

Select Role for each Category

Select the role you would like for each category listed.
Press the help button for a description of the roles.

| 232 Interested | 234 SME | 236 Subject Master | 238 Mentor | Category |
|---|---|---|---|---|
| ○ | ○ | ○ | ☐ | Architecture |
| ○ | ○ | ○ | ☐ | C |
| ○ | ○ | ○ | ☐ | CGI (Computer Graphics Interface) |
| ○ | ○ | ○ | ☐ | Conferencing |
| ○ | ○ | ○ | ☐ | Electronic Mail (E-Mail) |
| ○ | ○ | ○ | ☐ | Emerging Technology |
| ○ | ○ | ○ | ☐ | Extranet / Virtual Net |
| ○ | ○ | ○ | ☐ | Firewall |
| ○ | ○ | ○ | ☐ | Front Page |
| ○ | ○ | ○ | ☐ | IIS (Internet Information Server) |
| ○ | ○ | ○ | ☐ | Internet Technology |
| ○ | ○ | ○ | ☐ | Intranet |
| ○ | ○ | ○ | ☐ | NT Workstation (Windows NT Workstation) |
| ○ | ○ | ○ | ☐ | Process Sourcerer |
| ○ | ○ | ○ | ☐ | Routers |
| ○ | ○ | ○ | ☐ | Software Development |
| ○ | ○ | ○ | ☐ | TCP/IP (Transmission Control Protocol/Internet Protocol) |
| ○ | ○ | ○ | ☐ | Tools |
| ○ | ○ | ○ | ☐ | Virtual Reality |
| ○ | ○ | ○ | ☐ | Voice Recognition |
| ○ | ○ | ○ | ☐ | WIN9x (Windows 95/98) |
| ○ | ○ | ○ | ☐ | WinCE |
| ○ | ○ | ○ | ☐ | Wireless / Mobile Computing |

[ OK ]     [ Cancel ]

FIG. 7f  240

| Select Notification Option for each Category | | |
|---|---|---|
| None | Questions | Category |
| ○ | ○ | Architecture |
| ○ | ○ | C |
| ○ | ○ | CGI (Computer Graphics Interface) |
| ○ | ○ | Conferencing |
| ○ | ○ | Electronic Mail (E-Mail) |
| ○ | ○ | Emerging Technology |
| ○ | ○ | Front Page |
| ○ | ○ | IIS (Internet Information Server) |
| ○ | ○ | Internet Technology |
| ○ | ○ | Intranet |
| ○ | ○ | NT Workstation (Windows NT Workstation) |
| ○ | ○ | Process Sourcerer |
| ○ | ○ | Software Development |
| ○ | ○ | TCP/IP (Transmission Control Protocol/Internet Protocol) |
| ○ | ○ | Tools |
| ○ | ○ | WIN9x (Windows 95/98) |
| ○ | ○ | WinCE |
| ○ | ○ | Wireless / Mobile Computing |

OK    Cancel

FIG. 8a

TechLore Precision Search

Use the Basic Search

Describe what you are looking for.

I am looking for (a) [Document ▼] —252 that is (deals) with (a) [Report ▼] —254 and a [            ▼] —256    258 that deals with the keyword [Javascript]

Data added: [in the last 1 year ▼] —260

Sort By: [Date ▼]    262—[Go]

0 item(s) displayed.

FIG. 8b

TechLore Search

Use the Precision Search

Type in the keyword you are looking for.

[ Javascript ] ─272

Search Settings
Look for: ─274

☑ Content ☐ Discussions ☐ Events ☐ Members
☐ Packages ☐ Products ☐ Projects ☐ Vendors Where to look:
☐ In Name ─276  ☐ In Keywords ─278  ☑ In Abstracts ─280

Data added: [ in the last 1 year ▼ ] ─282

Sort By: [ Name ▼ ]   [ Go ]

| Infrastucture |

302   304

Contribute | Discussions

Customize your view

Show: ☐ Content   ☐ Events   ☐ Packages   ⟵ 306
      ☐ People    ☐ Products ☐ Projects Sort by: [Name ▼]   Max # to display [25 ▼]   [Go]

308                              310         312

📓 Doublin, Sandra (1998-02-17 10:12:34)
   Subject Master (SME) Lawlis, T (1998-02-19 10:42:34)
      Subject Matter Expert (SME) Nault, Mike (1998-02-17 16:44:47)
      Subject Matter Expert (SME) Royster, Christopher (1998-02-17 18:47:09)
      Subject Matter Expert Technology Implementaion Planning Change Process (1998-02-19 14:17:15)
   This is the change process for the technology Implementation plan Technology Implementation Planning Communication Plan (1998-02-19 14:26:53)
   This is the communications plan for the Waves TIPM Web Page (1998-02-18 11:04:44)
   This is the home page for the Operations Technical Support TIPM organization (SME) Woelfle, David (1998-02-19 09:45:46)
      Subject Matter Expert

⎫
⎬ 320
⎭

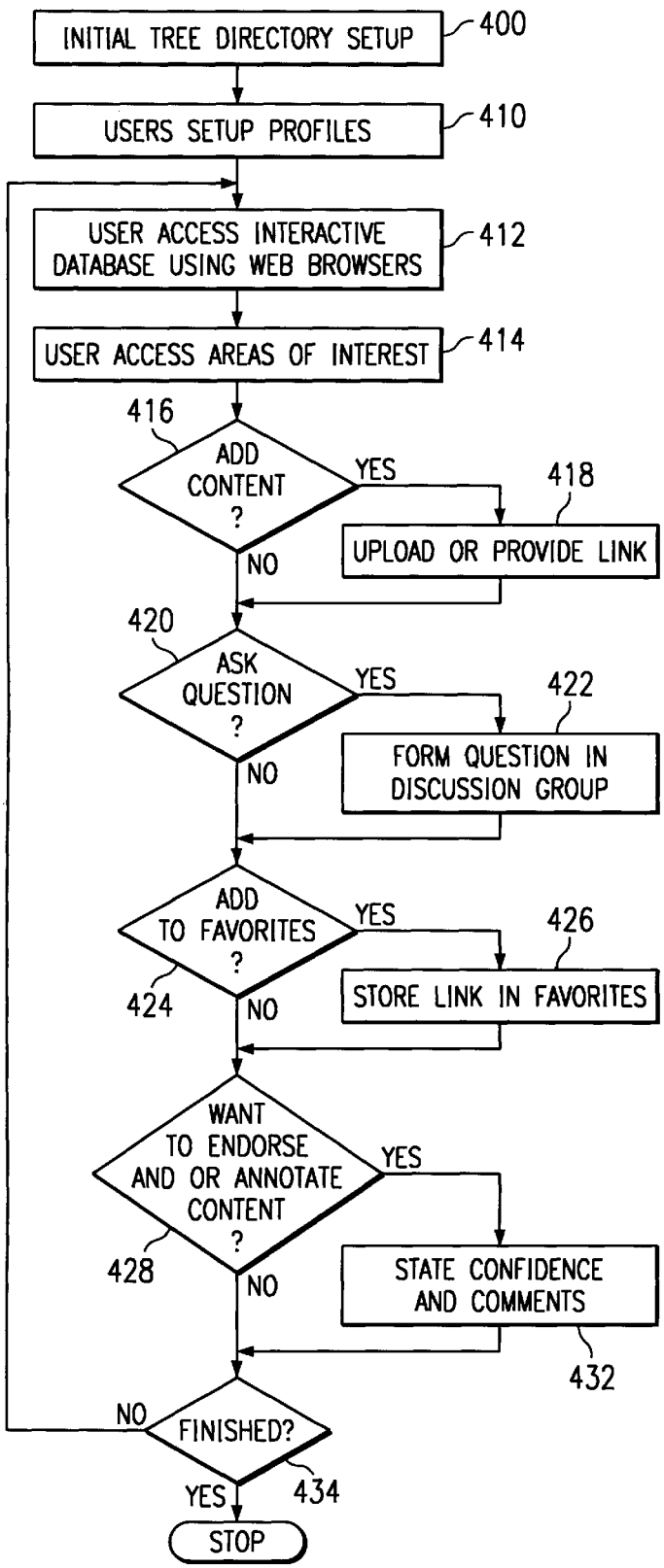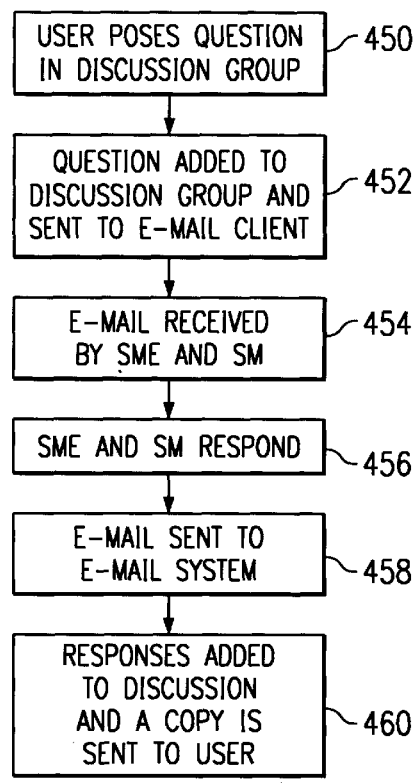

SYSTEM AND METHOD FOR AN INTERACTIVE KNOWLEDGEBASE

TECHNICAL FIELD OF THE INVENTION

This invention relates to information systems and more specifically to a system and method for an interactive knowledgebase.

BACKGROUND OF THE INVENTION

Information, especially technical information, is a vital ingredient to an organizations success. In small organizations informal personal networks are usually sufficient to disseminate and leverage information. In these smaller organizations an expert in one area is relatively easy to identify and consult. As organizations grow larger, informal personal networks fail to adequately address all of the members needs for information. While some members may have good information networks with good information leveraging, other members of the organization are left to reinvent what others have already done.

The rise of computers and especially the Internet and organizational Intranets have allowed some sharing of information over computer local area networks and wide area networks. However, organizational Intranet tend to have information structures which are dictated from above. Also, these Internets and Intranet are difficult to search, and are not amiable to users at all levels contributing information.

Discussion groups in these Intranet solutions also have drawbacks. To participate in these discussion groups a user has to be actively participating at the discussion group. This is inconvenient for many user who, while they would like to participate in a discussion, do not have the time to attach to the network, enter the discussion group and answer questions.

SUMMARY OF THE INVENTION

Accordingly, it may be appreciated that a need has arisen for an interactive knowledgebase system and method. In accordance with the teachings of the present invention, an interactive knowledgebase is provided which substantially eliminates or reduces the disadvantages and problems associated with existing database structures.

In one embodiment of the present invention, an interactive knowledgebase is provided. The interactive knowledgebase comprises a client and a server. The client is operable to generate a request for a category of information. Each category has one or more informational items associated with the category. The client is further operable to transmit informational items and comments about informational items. The server is coupled to the client and includes an interactive database and an information page builder. The interactive database comprising a plurality of informational items with each informational item associated with one or more categories of information. The information page builder is operable to automatically construct an information page using informational items stored in the interactive database and based on the request for the category of information. The server is further operable to receive informational items from the client and store them in the interactive database. The server is further operable to associate informational items with received comments about informational items and store them in the interactive database.

In another embodiment, a system of maintaining a category discussion group in an interactive knowledgebase is provided. The system comprises a server, a first client and a second client. The server is coupled to an interactive knowledgebase. The first client computer is coupled to the server and has a web browser program and an electronic mail client program. The second client computer is coupled to the server and has an electronic mail client. The first client posts a question to the category discussion group in the interactive knowledgebase. The interactive knowledgebase updates the category discussion to include the question and sends an electronic mail message to the second client. The second client is operable to send a response to the question via the electronic mail client. The reply is then routed to the first client and the interactive knowledgebase. The interactive knowledgebase updates the category discussion with the reply.

The present invention provides various technical advantages over current database systems. For example, one technical advantage is the ability to index all information using a tree directory. Another technical advantage is the ability to display information in a web browser. Another technical advantage is allowing all users equal ability to add items to any category of the knowledgebase. Another technical advantage is allowing users to voluntarily designate themselves as subject matter experts and subject masters. Finally, yet another advantage is to build threaded discussion involving a category from electronic mail responses of users independent of the interactive knowledge base. Other technical advantages may be readily apparent to one skilled in the art from the following FIGURES, descriptions and claims.

BRIEF DESCRIPTION OF THE DRAWINGS

For a more complete understanding of the present invention and the advantages thereof, reference is now made to the following description taken in conjunction with the accompanying drawings, in which like reference numbers represent like parts, in which:

FIG. 6 illustrates menu bar;

FIGS. 7a–7f illustrate the screens for setting user profiles;

FIGS. 8a and 8b illustrate the screens for the search routines;

FIG. 9 illustrates panel display for a typical entry in tree control;

FIG. 11 is a flowchart that illustrates the operation of the present invention; and FIG. 12 is a flowchart illustrating the electronic mail capabilities of the present invention.

DETAILED DESCRIPTION OF THE INVENTION

Figure 1:
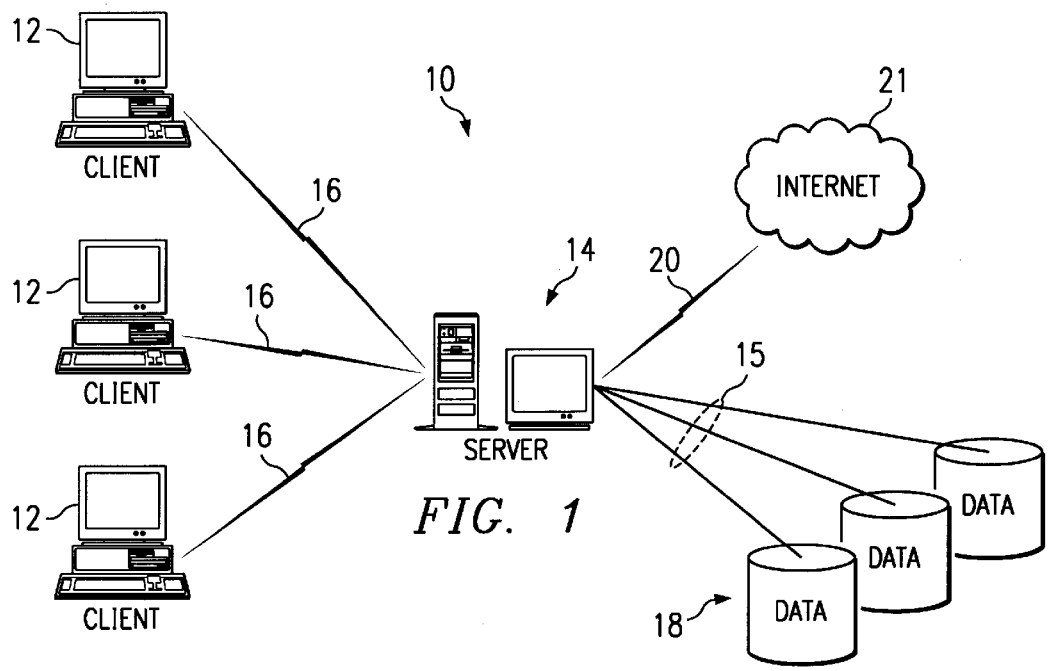
FIG. 1 is a diagram illustrating a network interconnection between a client computer and a server, such as an Internet web server, through a direct communication line.

FIG. 1 is a diagram illustrating a network interconnection 10 between a client computer 12 and a server 14, such as an Internet web server, through a direct communication line 16. In the embodiment shown in FIG. 1, client computer 12 is implemented using a personal computer or network computer and is illustrated more fully in FIG. 2. Server 14 may also interconnect with other client computers, similar to the interconnection with client computer 12, through a plurality of direct communication lines 16.

Network interconnection 10 also includes an interconnection or interface between server 14 and other Internet servers 21 through a plurality of communication lines 20. In this manner, server 14 allows client computers 12 to directly interconnect with server 14 through direct communication lines 16 to communicate with other Internet users by providing an interconnection to other Internet servers 21 through the plurality of communication lines 20. The other Internet users may also directly interconnect with a server such that a communication path may be established between one client computer and another client computer through the various servers of the Internet.

Server 14 is a computer such as a personal computer, file server, workstation, minicomputer, mainframe, or any other computer capable of communicating and interconnecting with other computers. Server 14 will generally include a processor, a printer, a keyboard, a monitor, a floppy disk drive, a memory, a modem, and a mass storage device such as a hard disk drive. In the embodiment shown in FIG. 1, server 14 is operable to run a web server program or a web page builder program. Direct communication lines 16 and communication lines 20 may be any type of communications link including a telephone communications link or a dedicated link such as an ISDN line.

In operation, client computer 12 uses a web browser to access server 14. A web browser is a computer program that allows the user's computer to act as a terminal operating from the server. Web browsers, such as NETSCAPE NAVIGATOR and MICROSOFT INTERNET EXPLORER, allow users to conveniently access and navigate the Internet through a graphical user interface. Web browsers are located on the user's computer and use a language of protocol to communicate. Most web browsers use a language called Hypertext Markup Language ("HTML") to communicate with a server so that web pages may be displayed.

Although network interconnection 10 has been illustrated and described in FIG. 1 as being a node or interconnection on the Internet, network interconnection 10 may be any interconnection found on any computer network such as a local area network ("LAN"), a wide area network ("WAN"), a corporate Intranet, or any other type of network.

Figure 2:
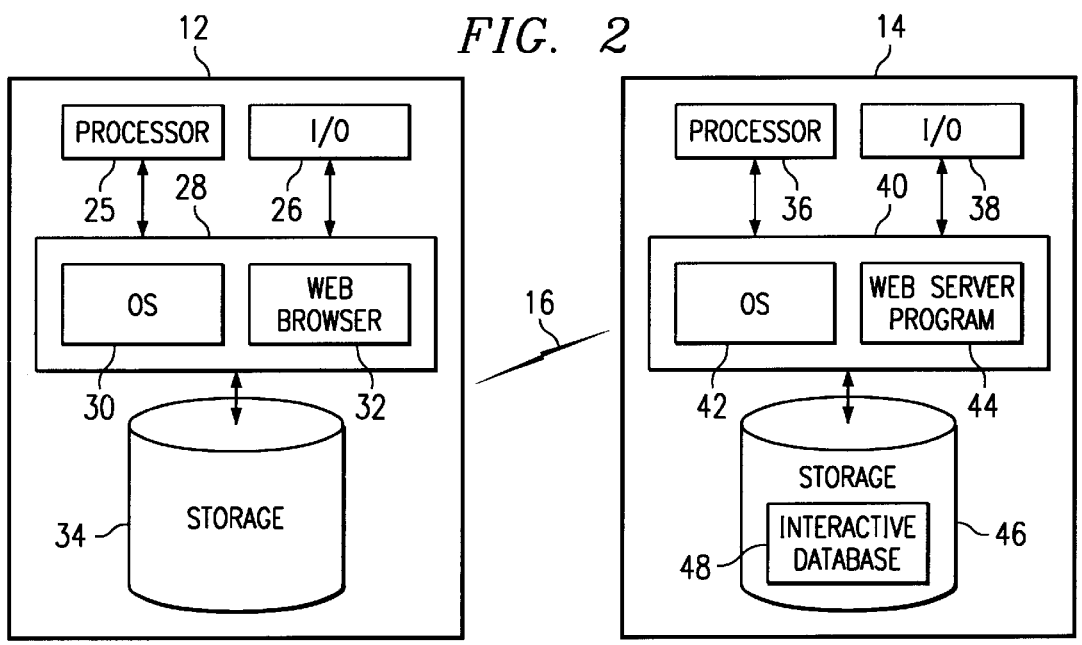
FIG. 2 is a block diagram illustrating client computer and server in more detail.

FIG. 2 is a block diagram illustrating client computer 12 and server 14 in more detail. Client computer 12 may be implemented using a computer that includes a processor 25, such as an INTEL or MOTOROLA microprocessor, a memory 28, such as a random access memory ("RAM") and/or read only memory, various I/O devices 26, and a mass storage device 34, such as a hard disk drive or optical drives used to store programs and files. I/O devices 26 may be any peripheral that allows data to be exchanged with client computer 12 and may include such things as a keyboard, a pointing device, such as a mouse, a monitor, a graphics tablet, a modem, and the like. Client computer 12 may be implemented using a personal computer operating under the control of an operating system such as WINDOWS 3.1, WINDOWS 95, WINDOWS NT, OS/2, DOS, UNIX, or other operating systems.

Client computer 12 includes an operating system 30 shown stored in memory 28. Operating system 30 is a master control program that manages and controls the internal functions and operations of client computer 12. Operating system 30 must also acknowledge and respond to requests from the devices of I/O devices 26 and to mass storage device 34. Operating system 30 may be implemented using virtually any operating system, such as those mentioned above.

Operating system 30 and a web browser 32 may be stored in mass storage device 34 and provided to memory 28. Mass storage device 34 may be a hard disk drive commonly found and used in personal computers. Operating system 30 is preferably loaded into memory 28 during initialization or boot-up of client computer 12. Web browser 32 may then be loaded into memory 28 either automatically during initialization or after being selected by a user. The user of client computer 12 may include non-technical personnel.

Processor 25, under the control of operating system 30, is used to retrieve, process, store, and display data. Processor 25 communicates control, address, and data signals with operating system 30 and with other components of client computer 12 through a system bus. Processor 25 may include an arithmetic logic unit used to assist processor 25 in performing mathematical operations. Processor 25 interprets and executes instructions that have been fetched or retrieved from memory 28, such as from web browser 32, and may be implemented as a single integrated circuit or as a combination of integrated circuits.

Web browser 32 is an application program and is shown loaded into memory 28 along with operating system 30. The instructions of web browser 32 are provided to processor 25 which is used to execute the instructions provided from memory 28. Web browser 32 allows a user of client computer 12 to request, view, update and interact with web pages stored on server 14.

Web browser 32 provides a graphical user interface and allow a user to view in-line images, fonts, and document layouts. Web browsers are also known as parsers which convert large units of data into smaller, more easily interpreted pieces. A parser reads the tagged text of information pages or web pages and formats the various portions of the pages for on-screen display. For example, a web browser reads information pages or web pages that have been prepared with a markup language, such as HTML. The markup language identifies the parts of the file, such as document headings, bulleted lists, or body text, but says nothing about how these parts should appear on-screen. The web browser then reads the text and formats the various parts of the information page and other content for on-screen display. Certain terms on a web page can be "hypertext" terms. A user can select that term which will then lead to another related section of text or recall another web page.

Server 14 may be implemented using a computer that includes a processor 36, such as an INTEL or MOTOROLA microprocessor, a memory 40, such as a random access memory ("RAM"), various I/O devices 38, and a mass storage device 46, such as a hard disk drive used to store interactive knowledgebase 48. I/O devices 38 may be any peripheral that allows data to be exchanged with server 14 and may include such things as a keyboard, a pointing device, such as a mouse, a monitor, a graphics tablet, a modem, and the like. Server 14 may be implemented using a computer operating under the control of an operating system such as WINDOWS, WINDOWS 95, WINDOWS NT, OS/2, DOS, UNIX, or other operating systems.

Server 14 includes an operating system 42 shown stored in memory 40. Operating system 42 is a master control program that manages and controls the internal functions and operations of server 14. Operating system 42 must also acknowledge and respond to requests from the devices of I/O devices 38 and to mass storage device 46. Operating system 42 may be implemented using virtually any operating system, such as those mentioned above.

Operating system 42 and a web page builder and server program 44 may be stored in mass storage device 46 and provided to memory 40. Mass storage device 46 may be a hard disk drive commonly found and used in personal computers. Operating system 42 is preferably loaded into memory 40 during initialization or boot-up of server 14. Web page builder and server program 44 may then be loaded into memory 40 either automatically during initialization or after being selected by a user. Mass storage device 46 may also store items for web pages in interactive knowledgebase 48. Each web page transmitted to client 12 corresponds to a category accessible by client computers 12 using a web browser 32, via servers 14 and web server program 44.

Processor 36, under the control of operating system 42, is used to retrieve, process, store, and display data. Processor 36 communicates control, address, and data signals with operating system 42 and with other components of server 14 through a system bus. Processor 36 may include an arithmetic logic unit used to assist processor 36 in performing mathematical operations. Processor 36 interprets and executes instructions that have been fetched or retrieved from memory 40, such as from web server program 44, and may be implemented as a single integrated circuit or as a combination of integrated circuits.

Web page builder and server program 44 is an application program and is shown loaded into memory 40 along with operating system 42. The instructions of web server program 44 are provided to processor 36 which is used to execute the instructions provided from memory 40. Web page builder and server program 44 allows a user of server 14 to create, update, and maintain a database comprising a plurality of information pages, known as web pages, as shown stored in mass storage device 46 of FIG. 2. Informational pages or web pages are provided in web browser compatible format, such as HTML format, so that the files may be displayed using a web browser.

In one embodiment, web pages do not physically exist in mass storage device 46 or interactive knowledgebase 48. Instead, interactive knowledgebase 48 contains all the items that will appear on web pages. When client 12 requests a web page, a web page is built on the fly using a preexisting template and filled via searching knowledgebase 48 for appropriate content. Web page builder and server program 44 automatically builds a web page based on a template and the content of the database. The advantage of building a web page on the fly is that any addition to knowledgebase 48 can automatically be integrated into a new web page when requested instead of having to rewrite a web page to incorporate the changes. One example of a web server that has this functionality is MICROSOFT ACTIVE PAGE SERVER and MICROSOFT INTERNT INFORMATION SERVER.

A user at client computer 12 running a web browser 32 can access the information stored at server 14. A user can select a desired category from a listing. The web browser 32 then sends a request to web page builder and server program 44 using an HTTP protocol. The web page builder and server program 44 then locates the appropriate informational items, builds a web page, and sends it to web browser 32 for display.

Figure 3:
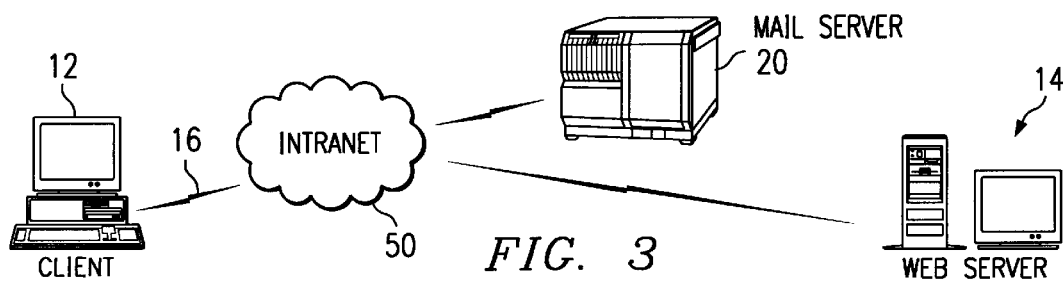
FIG. 3 illustrates a client computer and server including an electronic mail server in accordance with the teachings of the present invention.

FIG. 3 illustrates a client computer and server including an electronic mail server in accordance with the teachings of the present invention. As illustrated, client 12 is coupled to server 14 via connection 16, In this embodiment, this connection goes through an organizational Intranet 50, although other embodiments utilizing the Internet or direct connections between client and server are also possible. Mail server 20 is illustrated as separate from server 14 although it can be included as part of server 14. Mail server 20 is operable to receive electronic mail message composed inside of interactive knowledgebase 48 and route them to specific clients 12. Electronic mail messages can then be received by a user without the user having to be accessing interactive knowledgebase 48. Replies to those messages are routed back to interactive knowledgebase 48 and also sent to the user who posted the question.

Figure 4:
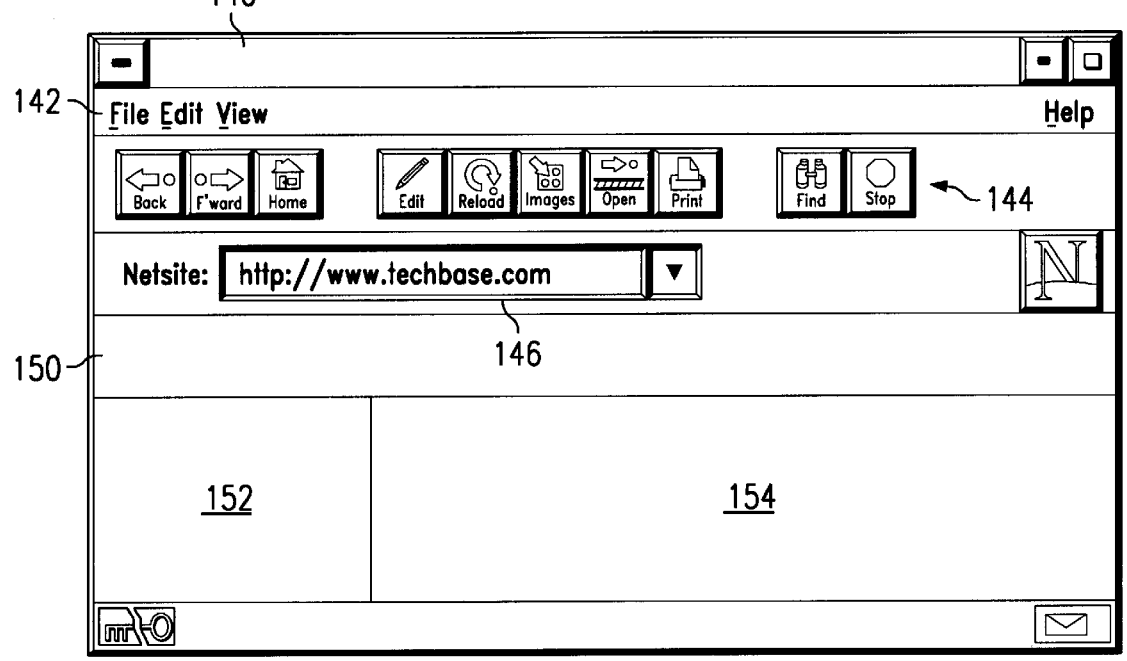
FIG. 4 illustrates a web browser accessing the interactive knowledgebase according to the teachings of the present invention.

FIG. 4 illustrates a web browser 32 accessing the interactive knowledgebase 48 according to the teachings of the present invention. Illustration is a commercial web browser 140, such as NETSCAPE NAVIGATOR or MICROSOFT INTERNET EXPLORER. Web browser 140 includes a number of pull down menus 142, Navigational button bars 144, a universal resource locator (URL) panel 146 which tracks what specific web site is being accessed. Navigation button bars provide such functionality as go back a page, go forward a page, stop loading a page and reload a page. These buttons are used as normal in interactive knowledgebase 48. Interactive knowledgebase 48 is being displayed as three frames in FIG. 4. This is for illustrative purposes only. The number of frames is a choice left to the designer of the web pages. Frames divide a web browser view into a number of windows, each window capable of displaying individual content from different web pages. Illustrated in FIG. 4 are a menu bar 150, a tree control 152 and a display panel 154. Menu bar 150 is always displayed and provides a button bar for commonly needed functions. Tree control 152 is always displayed and shows the tree hierarchy of subjects in interactive knowledgebase 48. Display panel 154 displays the current information based on the subject chosen in either tree control 152 or menu bar 150. When a user initially starts interactive knowledge base, display panel 154 displays an initial welcome page.

FIG. 4, therefore, illustrates what a user would see when running web browser 32 on client computer 12 to access interactive knowledgebase 48 running on server 14.

Figure 5:
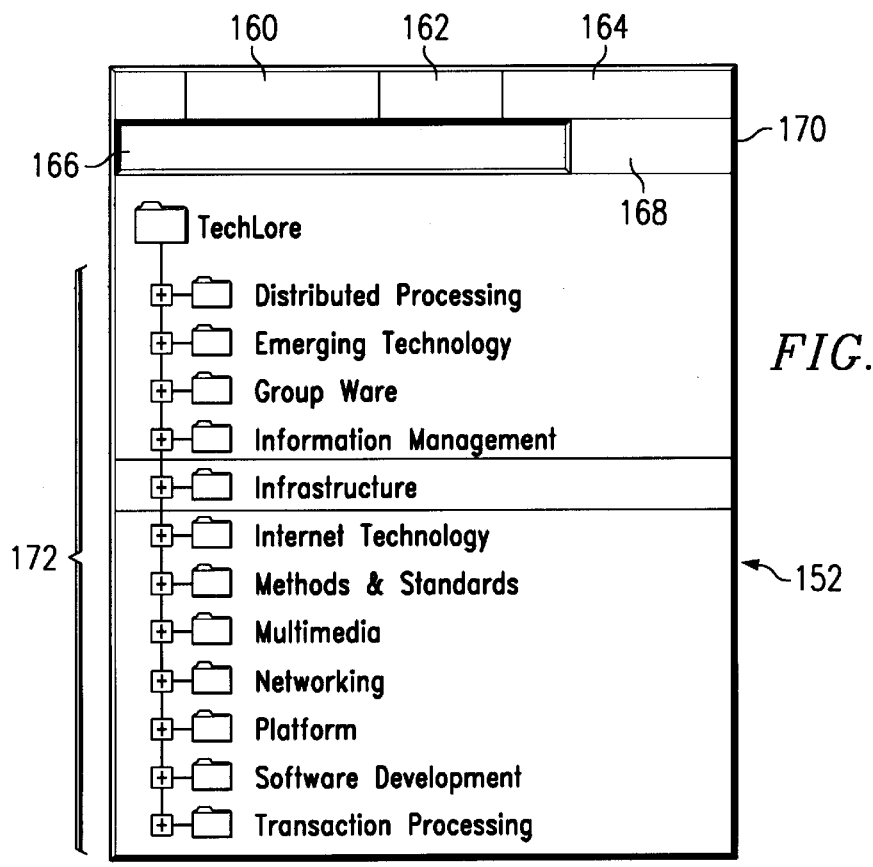
FIG. 5 illustrates tree control in more detail according to the teachings of the present invention.

FIG. 5 illustrates tree control 152 in more detail according to the teachings of the present invention. Tree control 152 is operable to display one of three different views. There are a category listing 160, a favorite listing 162 and a views listing 164

When category listing 160 is chosen, a tree directory 172 is displayed. Tree directory 172 is a hierarchal directory of all categories and sub-categories in interactive knowledgebase 48, starting with general categories and branching to more specific categories. By selecting a general categories, other branches under that category may be revealed as sub-category under that topic. Again, categories in the branches may be selected, revealing additional sub-categories. For example, by selecting emerging technologies, sub-categories of virtual reality, personal digital assistants and others may appear under the general heading of emerging technologies. By selecting one of the sub-categories, a web page for that sub-category will be displayed in display panel 154.

Tree directory 172 is constructed prior to adding content to interactive knowledgebase. Tree directory 172 is constructed by a system administrator or similar expert. Users of interactive knowledgebase 48 have the ability to suggest additions, deletions or adjustments to categories in tree directory 172.

In one embodiment, tree directory 172 is a JAVA applet which is downloaded to client 12 when interactive knowledgebase 48 is accessed. Sub-categories may be found under several categories headings depending on its applicability. Additionally, every branch level of the tree directory 172 may have both sub-categories and information entries.

Box 166 allows a user to type in the name of a category and search for it after selecting find box 168. This provides a fast way to find topics and sub-topics without searching the entire tree directory 172.

Selecting favorite listing 162 displays a list of the users favorite or most useful areas of interactive knowledgebase 48. A user can select which particular part of interactive knowledgebase is to be listed under favorite listings when accessing that part of interactive knowledgebase 48. When an important item is displayed in display panel 154, a user can click an add button on directory tree 172 and add that item to the list of favorites. When a user selects favorite listings 162, the list of favorites appears in a window. These can be viewed by selecting on an entry in a list which will cause the client to request that item from the server and display it on web browser 32. A favorite item can also be deleted by selecting a delete button. Further discussion of favorite listing is in conjunction with FIG. 9.

Selecting views 164 on the director 172 brings up a window that allows a user to view a listing of selecting items organized by types of items instead of by category. For example, a user can view all members of interactive knowledge base 48, all projects, etc.

Figures 6, 7A:
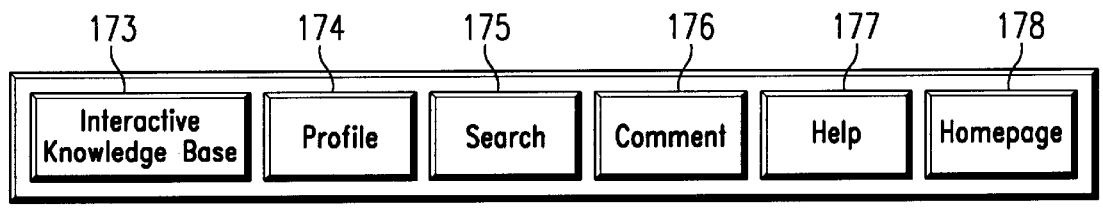

FIG. 6 illustrates menu bar 150. Menu bar 150 contains a plurality of buttons which access features needed throughout the operation of interactive knowledgebase 48. In one embodiment top frame includes a technological database button 173, a profile button 174, a search button 175, a comment button 176, a help button 177 and a home button 178.

Interactive knowledgebase button 173 when selected resets the web browser to the initial state of interactive knowledgebase 48 and displays it in display area 154.

Profile button 174 when selected brings up the user registration screens in right window 154. User profile screens are used to set or modify user preferences. FIG. 7a illustrates a first registration screen 180. First registration screens 180 display current information regarding a user and allows a user to update that information. Demographic profile section 182 shows demographic information such as user name, phone numbers, Internet mail address and other information. Profile information section 184 contains a list of profile information entries for address 186, personal information 188, interests 190, roles 192 and notification 194. To the right of these entries is a status indicator 196 which indicates if the information entry has been completed or not. Each of the profile entries can be selected for updating and changing. This also allows a user to be associate with different database fields so that when the web page builder creates a web page regarding a certain category, individuals which are connected to that category by these entries can be included in the web page.

Selecting address 186 brings up an address registration screen 200 as seen in FIG. 7b. At this screen a user can enter or change his address including street address, city, state/province, zip/postal code, country and primary language spoken.

Selecting personal information 188 brings up a personal information screen 210 as seen in FIG. 7c. At this screen a user can enter the URL of his or her home page in the home page box 212. A user can also enter keywords to describe him or herself in keyword box 214. These keywords may be technical terms of areas with which the user is knowledgeable in. This allows other users to search for individuals based on topics of expertise. It also allows the user to be indexed by some or all these items in the interactive knowledgebase 48.

Figure 7D:
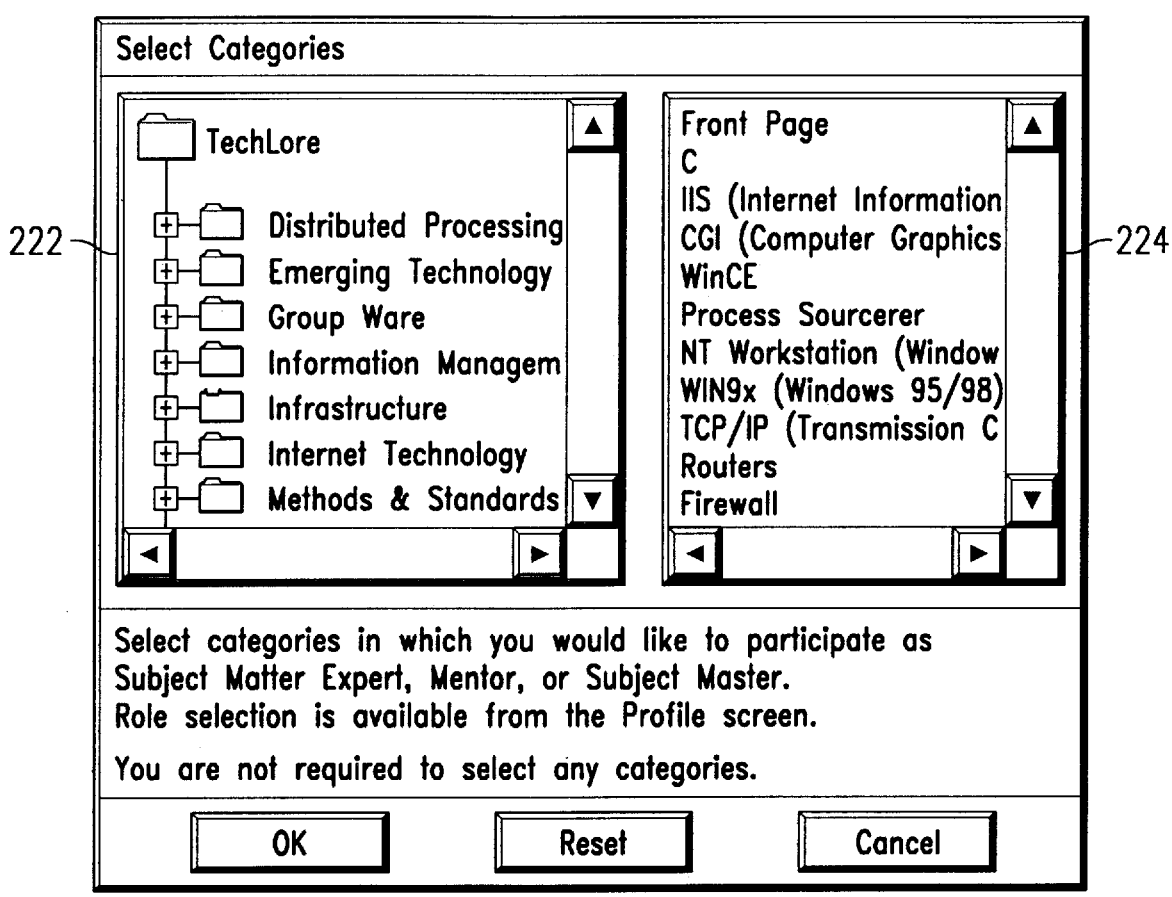

Selecting interests 190 brings up an interest screen 220 as seen in FIG. 7d. Interest screen 220 consists of two parts. Directory portion 222 shows a window reproducing tree directory 172. A user chooses entries from the tree directory and adds them to a selection portion 224. A user is free to choose as many or as few categories of interest as they desire.

Selecting roles 192 brings up a role screen 230 as seen in FIG. 7e. Role screen 230 lists in one column all the categories that the user indicated he was interested in. There are also four other columns. One column is interested 232, one is subject matter expert 234, one is subject master 236, and one column is mentor 238. A "radio" button appears under interested 232, subject master expert 234, and subject master 236. A "radio" button means that only one of those three columns can be selected. If a user selects interested 232 for a particular category, that simply denotes that the user is interested in that particular category. If a user selects subject matter expert 234 for a particular category, that denotes that the user considers himself an expert in that particular category. A subject matter expert can receive questions concerning a particular category that he or she is a subject matter expert in. If a user selects subject master 236, the user is denoting he is an expert in that area and he or she also receives electronic mail notification of any questions in the category the person is a subject master in. A subject master also has the ability to delete material that the subject master feels is inaccurate/inappropriate in a given category. A user can also select mentor 238 for any category. This indicates the user is willing to help others who are learning about a certain topic.

The choice of whether a user is interested in a category, is a subject matter expert or is a subject master is up to the user. This type of democratic designation ability helps make the present invention an open system that allows participation by members of an organization irrespective of the users current rank in the organizations hierarchy and helps to utilize the talents of many individuals.

Selecting notification 194 brings up a notification screen 240 as seen in FIG. 7f. Notification screen 240 lists all categories that the user indicated he or she is a subject matter expert or a subject master in. A user can select either the none button or the questions buttons for each category listed. Selecting questions indicates that the user wishes to be notified immediately when another user posts a question in that particular category.

Selecting none indicates the user does not want immediate notification of questions. Users who choose immediate notification will be immediately notified when a question is posted in a topic. The user is notified via electronic mail and does not have to be using interactive knowledgebase 48. Also, when an automatic notification is responded to via an electronic mail reply, it is posted in the appropriate discussion group and a copy of the response is sent to the poster of the question via electronic mail.

Referring back to FIG. 6, another selection which can be made is of search button 175. Selecting search button 164 brings up one of two search screens. FIG. 8a depicts a basic search and FIG. 8b depicts a precision search screen.

FIG. 8a depicts a basic search screen 250. Box 252 contains a pull down list of types. Types are the types of items found in the categories of tree directory 172. Types can be content, packages, discussions, products, events, projects, members, vendors or others (miscellaneous type).

Others can be documents, web sites, spreadsheets and other kinds of similar miscellaneous information. Discussions comprises questions and answers as well as comments on a subject that are organized by subject (also known as organized by threads). When a user poses a question and others answer, that is a discussion. Events are listings of upcoming activities. Projects contain information concerning work projects for a particular subject. Products contain information regarding third party products. Members are entries that contain information regarding the users. Vendors is a similar list with information regarding vendors used by a company or organization. Packages are custom groupings of the other types. Additional types can also be added. Once a type is selected, box 254 and box 256 are used to pick subtypes. Choosing subtypes are optional. A subtype is a further division of a type. For example, another type may have the subtype of report and a further subtype of quarterly reports. Box 258 allows a keyword to be searched for. Date box 260 is a pull down menu operable to allow a user to choose a date range to search over.

In operation, a user of basic search screen 250 would choose to search for a type. For example, document might be selected. Then a subtype can be chosen. The subtype, in this example, is report. Box 256, reserved for further subtypes, is left blank in this example. The user then chooses a key word, in this example JAVASCRIPT, and selects a data range of in the last year. After selecting go button 262, all documents of the subtype reports are searched for the occurrence of the word JAVASCRIPT. The results are then returned to the user and displayed on web browser 32.

FIG. 8b illustrates precision search routine 270. In this routine keywords are typed in keyword box 272. Then in a look for section 274, a user selects the type to be searched. Boxes exist for all types. Next, user selects where to look for. Choices include searching in a name section 276 which searches for a name associated with the keyword, searching in a keyword section 278 or searching in an abstract section 280. Date box 282 is used to select a date range.

In operation a user would type in pertinent keywords such as JAVASCRIPT in keyword box 272. The user would select what type will be searched. In this case, user selects content. The user selects where to search. In this example, the user selects abstracts. The user also narrows the search for within the last year. After executing the search, the database is searched for any abstract of any content written in the last year that contains the word JAVASCRIPT. The results are then displayed at the user's web browser.

Referring back to FIG. 6, comment button 176 can be selected at any time. When selected, a screen appears in which a user can type information that will be sent to the system administrator. Comments can be praise, criticisms, suggestions or other statements that then user wishes to express to the system administrator. Comments are context sensitive; the comment form changes based on what the user is currently viewing or trying to do.

Help button 177 is used to bring up help information. Help information is displayed in a separate windows box in order to preserve the current display. Help information is context sensitive; help information varies depending what part of interactive knowledgebase 48 is being used.

The final button, home page 177, exits interactive knowledgebase 48 and sends the user to another web page such as the home page for a corporation implementing the present invention.

FIG. 9 illustrates panel display content for a typical entry in tree control. Illustrated is a category page 300. At the top is the name of the category, in this case infrastructure. The category of the page appearing is chosen from tree directory 172. Next are two selectable items, a contribute tag 302 and a discussion tag 304. By selecting contribute tag 302, a user is able to add his or her contribution to this category page 300. The user is able to contribute any item. Items can be an event, a certain products, a project, or other content type like a report. An item can also be a package, which is a collection of events or projects or other type of information "packaged" together. In the present invention, any user can contribute to a category.

When a user selects contribute tag 302, a page appears on display panel 154 that allows a user to enter bibliographical information about the item. The user may also decide how long an item will stay on the system (an expiration date) and what other categories the item is useful for. When the item is stored to the system, it can be indexed by these parameters such that the web page builder can find the appropriate items for every category. After entering preliminary information, the user can then either upload the item to the server or send the server a URL of where the item is located. This item is immediately available to the system and all users. A user who contributes an item has the ability to edit that item or delete that item.

For example, if an user has just finished writing an article concerning a new JAVA development tool, the user can select the category JAVA from tree directory 172 and the select the contribute tag 302. The user will then fill out any appropriate keywords or other bibliographical information regarding the article. Since this article is JAVA specific, the user chooses not to cross post it. Then the user uploads the article to the server which saves it to the interactive knowledgebase 48 as a database entry indexed by the appropriate bibliographical information. The next time a user access the category JAVA, the web page builder will search for all items related to JAVA in the database and then build a web page that displays those items. The web page is then sent to the requesting client. This web page will incorporate the new article.

Figure 10:
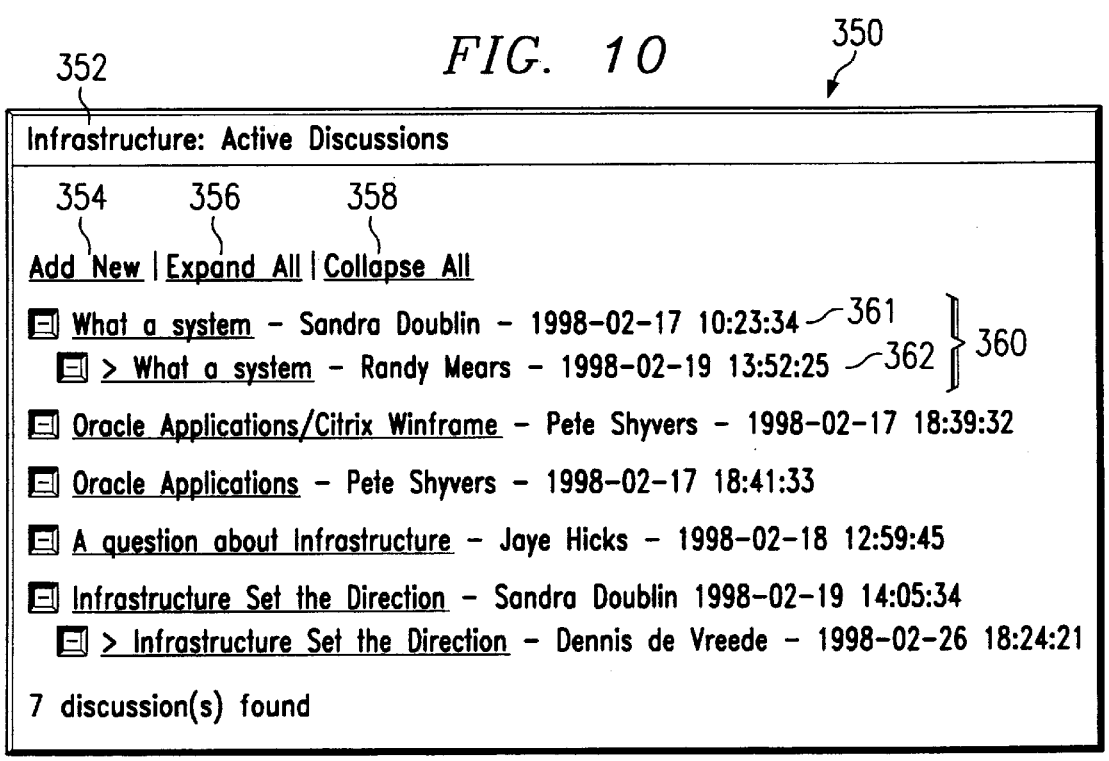
FIG. 10 illustrates the discussion pages of the present invention.

Discussion tag 304, when selected, brings up a discussion page 350 as illustrated in FIG. 10. Discussion page 350 includes a category name area 352 which lists the category name of the discussion. An add new tag 354, an expand all tag 356, and a collapse all tag 358 are also included. Underneath those tags, the subject of each discussion is shown. Discussion concern categories and not items located in a category. The left-most title for a discussion is the initial discussion entry for that subject. For example, in FIG. 10, discussion 360 has an initial subject entry of "what a system" 361 and a response to that discussion of "what a system" 362. An unlimited number of different discussions can occur at any one time on active discussion page 350. To add a new discussion, a user clicks on the add new tag 354. Then, the user would enter a title for the discussion and the comments or questions the user has for his or her new discussion. Expand all tag 356 is operable to display all the responses to a specific discussion. Collapse all tag 358 is operable to show just the initial discussion. The name of each topic is operable to be selected, which then displays the message. Once a message is read by a user, that user has the ability to respond to the initial discussion or pose a question under that discussion. Responses and questions would then appear under the initial discussion as responses. A set of an initial question and all the response underneath that question is a single discussion thread. Discussions are displayed by threads.

If a user poses a question under discussion page 350, that question is automatically routed to every subject matter expert and every subject master which indicated that he or she would like to receive notification of messages from that particular topic. The subject master and subject matter experts are immediately notified of any messages even if those individuals are not currently viewing interactive knowledgebase 48. The subject matter experts and subject masters are then able to respond to those questions through their own electronic mail client without having to enter interactive knowledgebase 48. Responses from the subject master and subject matter experts are automatically received by interactive knowledgebase 48 and integrated into the discussion on discussion page 350. A response is also sent to the user who posed the question via electronic mail.

Turning back to FIG. 9, FIG. 9 also has a customize view area 306 which allows a user to display any or all of six of the eight types. The user may choose to show only content, only events, only packages, only people, only products, or only projects, or a combination of any or all of those six types. Discussions are not included in customize show area 306, because discussions are separately selectable by discussion tag 304. Although a vendor is also a type, that is not shown in this view either because vendors are not maintained within tree directory 172 of interactive knowledgebase 48. Of course, these types are shown for example purposes only and other different types can exist depending upon the application that an individual user would have. Sort box 308 allows the contents of a page to be sorted either alphabetically or in any other fashion. Display box 310 allows a user to set how many different items are displayed at one time. Go button 312 would then display all information that the user chooses to view. For example, if the user only wishes to view people sorted by name and limited to only 25 people, by pressing the go button information concerning all the people associated with this category would be displayed in alphabetical order and only the first 25 names would appear. The next 25 names would appear by selecting the "next" link listed after the 25$^{th}$ item.

Information area 320 lists the information shown by the user's choice of view. Again, this could be people such as a list of subject matter experts and subject masters. It could also be content such as reports, web pages or white papers. It can be events such as listings of events dealing with infrastructure. It can be products such as products developed by the company concerning infrastructure. It could be packages which are collections of different types. Or it can list projects such as ongoing projects in the area of infrastructure.

Each one of the entries in information area 320 would be linked to another area where that information is then shown in full. For example, if an individual's name is listed as a subject master, selecting that individual's name will display more information about that person. Also, selecting an individual's name allows a user the opportunity to send electronic mail to that person. If the entry is for a report, selecting the name of the report will display the report information or report abstract. In other words, the name of the report would be a link to where an abstract of that report is stored, the abstract then has a link to the actual report. The abstract lists bibliographical information about the item as well as any comments or annotations another user has written about the item. The actual report may be stored in interactive knowledgebase 48 or on some other web server at some different location. Once the report is displayed, a user can read the report. Any user, after reading the report, can comment as to its usefulness or provide some type of annotation. The report's abstract would have associated with it a listing of all the annotations and endorsement that users have had as to the usefulness of that report. A subject master could also delete the report if he or she felt the report was not pertinent to the topic or was so rife of errors as to be misleading or not useful.

In one embodiment, every topic exists as a separate web page stored in a database either on the same server as web server program 44, or separate from web server program 44. Each web page will be identified by a unique URL.

FIG. 11 is a flowchart that illustrates the operation of the present invention. In step 400, the original tree directory 172 is set up by a system administrator. This involves compiling a list of all topics and sub-topics for a particular database. Only the system administrator can add or remove categories and items from tree directory 172. However, users can suggest categories be added, eliminated or combined. In step 410, users set up their profiles. The process to set up profiles is discussed in detail in FIGS. 7a through 7f. It is important for the viability of the system that users select different categories where they are interested and different categories where they are actually the subject master or a subject matter expert. In step 412, the user will access interactive knowledgebase 48 using web browser 32.

In step 414, a user accesses areas of interest to him or her. When accessing categories of interest, the user may view items concerning any of the types which are posted in that category of interest. A user might access a category of interest based upon some work need. For example, a user may be working with JAVASCRIPT for the first time and may want to peruse articles discussing JAVASCRIPT. Once the JAVASCRIPT category is found in tree control 172, it can be selected. Client 12 then sends a request to the server 14. The web page builder and server program 44 queries the interactive knowledgebase 48 for all items relating to that category (JAVASCRIPT) and then builds and returns a web page to client 12. A user can then select any item on that informational page (web page)

In step 416, a user can decide whether or not it wants to add anything to the informational page. If so, in step 418, a user fills out bibliographical information concerning the item and would then either upload that information to server 14 using conventional web browsing uploading techniques such as a file transfer protocol or send the server a link to the information if the information already exists on a different web site. This allows information already existing in different web sites to be reproduced without having to transfer the entire contents.

In step 420, a user can decide whether or not to add a question to a discussion. If a user decides to ask a question, in step 422, the user formulates the questions and enters it into the discussion area. Those questions are then e-mailed to all subject matter experts and subject masters who wish to receive electronic mail on that topic. Further discussion of the electronic mail system of the present invention is discussed in conjunction with FIG. 12.

In step 424, a user may add a particular article on the web page or the web page itself to the user's list of favorite sites and information. As discussed in FIG. 5, once a favorite is added to a list of favorites, it is viewable by clicking on the favorite button on tree control 152. Favorite links are stored in step 426. In step 428, a user decides whether or not it wants to endorse or comment on existing information on the web page. If a user wishes to enter an endorsement or annotation for a particular item the user simply enters the endorsement or annotation. An endorsement represents how a user feels about an item based on its usefulness or accuracy. This could even include indicating graphically a users in the article. An annotation is typically a point of clarification about an item or some type of technical correction. Also, if the user is a subject master, the user has the ability to delete any article posted in the category that he or she is the subject master in. Also, the author of the item has the unique ability to edit an item that he or she is responsible of adding. An author of an item can also delete all occurrences of his item across all categories (this can be contrasted with a subject master who can only delete items appearing in the specific categories he or she serves as a subject master in.

In step 434, it is determined whether or not the user is finished using interactive knowledgebase 48. If the user is finished using interactive knowledgebase 48, then the user would then stop use. If not, control goes back to step 412, where the user accesses interactive knowledgebase 48 using web browser 32 and it connects as other areas of interest.

FIG. 12 is a flowchart illustrating the electronic mail capabilities of the present invention. In step 450, a user poses a question in a discussion group in interactive knowledgebase 48. That question is automatically added to discussion group in interactive knowledgebase 48. If it is the first time that subject is asked, then it would be a parent subject. If it is a question or comment responding to a preexisting subject, then it would be a response to the original subject. Once the question is formulated, interactive knowledgebase 48 would format that question for electronic mail. Interactive knowledgebase 48 would then access a list of all of the users who had indicated previously that they wished to receive mail concerning this specific topic and sends the message in step 452. In step 454, that electronic mail is received by those individuals which had previously indicated they wished to receive information regarding that topic. Significantly, those users who received that electronic mail do not have to currently be accessing the technological database to receive the electronic mail. The electronic mail appears in the user's regular electronic mail client.

In step 456, the user can respond to the question. To respond to the question, all the user has to do is indicate that it wants to respond to the question using its current electronic mail client. Then, the user types in a response to the question and sends it back to interactive knowledgebase 48, in step 458. In step 460, the electronic mail is routed back to discussion page where the user's response is then integrated into the discussion as a response to that first user's question automatically. Therefore in this manner, discussion content can be added to by any individual who receives electronic mail message regarding a question without any of the responders having to enter interactive knowledgebase 48. The response is also sent to the user that originally posted the question via electronic mail.

Thus, it is apparent that there has been provided, in accordance with the present invention, an interactive knowledgebase system and method that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

Although the present invention has been described with reference to the Internet and intranet, it should be understood that the present invention is not limited to the Internet or intranet. The present invention may be practiced using any type of computer network or communication and data exchange system; the present invention is not limited to use with the Internet or with an intranet. Also, although the term web browser compatible file or information page has been used in describing the present invention, the present invention is not limited to the generation of web browser compatible files. The present invention includes the generation of any computer file that provides information and that is capable of being processed and displayed using a computer program. Such a computer program may include a parser capable of breaking large units of data into smaller more easily interpreted pieces. Finally, although the present invention has been illustrated and described with respect to the creation, update, and maintenance of abstract files containing abstract information, it should be understood that the present invention is not limited to files containing abstract information. The present invention encompasses the creation, update, and maintenance of files containing any available information content. Other examples of changes, substitutions, and alterations are readily ascertainable by one skilled in the art and could be made without departing from the spirit and scope of the present invention.

What is claimed is:

1. An interactive knowledge base comprising:
a client operable to generate a request for a category of information, each category associated with one or more informational items and a plurality of questions and answers, the client further operable to communicate informational items associated with one or more categories of information; and,
a server coupled to the client comprising:
an interactive database comprising a plurality of informational items, each informational item associated with one or more categories of information, the database also comprising a discussion group associated with one or more categories of information, the discussion group comprising at least one question and answer associated with the category of information, at least one of the answers submitted in response to a question and communicated to the database by a second client, wherein a user associated with the second client can select to serve as one of a plurality of expert types for at least one category of information, the plurality of expert types including a subject matter expert that may receive the question associated with the at least one category of information and submit the answer to the interactive database, the plurality of expert types also including a subject master that may receive the question associated with the at least one category of information, submit the answer to the interactive database, and remove information from the at least one category of information in the interactive database; and,
an information page builder operable to automatically construct an information page using informational items stored in the interactive database and based on the client's request for the category of information;
the server further operable to receive informational items from the client, associate the informational items received from the client with one or more categories of information, and store the informational items in the interactive database.

2. The system of claim 1, wherein the client includes a web browser operable to display the information pages.

3. The system of claim 2, wherein a navigational display bar is displayed in a frame of the web browser.

4. The system of claim 1, wherein the server maintains a directory of the items organized by categories and the directory is displayed in a window at the client.

5. The system of claim 4, wherein the directory is a JAVA applet.

6. The system of claim 1, wherein the user associated with the second client can further decide to serve as a mentor for a particular category.

7. The system of claim 6, wherein the mentor agrees to help a user associated with the first client learn about a topic associated with the particular category.

8. The system of claim 1, wherein any user can pose questions and comments to the discussion group.

9. The system of claim 1, wherein the interactive knowledgebase is operable to send a posted question in the discussion group to certain expert users and wherein the expert users may read and respond to those questions without accessing the interactive knowledgebase.

10. The system of claim 1, wherein a user is able to save a list of favorite items.

11. The system of claim 1, wherein a user is able to complete a user profile which can be used to index a user.

12. The system of claim 1, wherein a search screen is provided to find items quickly.

13. The system of claim 1, wherein any user can add an item to any category.

14. The system of claim 13, wherein the user can set a time limit at which the item added automatically expires.

15. The interactive knowledge base of claim 1, wherein the client is further operable to communicate comments about informational items to the server.

16. The interactive knowledge base of claim 15, wherein the server is further operable to associate informational items with received comments about informational items and to store the comments in the interactive database.

17. The system of claim 15, wherein comments about information items include endorsements and annotations about the information items.

18. A system of maintaining a category discussion group in an interactive knowledgebase comprising:
   a server coupled to an interactive knowledgebase, the interactive knowledgebase comprising a plurality of discussion groups each associated with one or more categories of information, each discussion group comprising a plurality of questions and answers associated with the category of information, the interactive knowledgebase also comprising a plurality of informational items, each informational item associated with one or more of the categories;
   a first client computer coupled to the server and having a web browser program and an electronic mail client program;
   a plurality of second client computers coupled to the server and each having an electronic mail client; at least one of the second client computers associated with a user that can select to serve as one of a plurality of expert types for at least one category of information, the plurality of expert types including a subject matter expert that may receive the question associated with the at least one category of information and submit the answer to the interactive knowledgebase, the plurality of expert types also including a subject master that may receive the question associated with the at least one category of information, submit the answer to the interactive knowledgebase, and remove information from the at least one category of information in the knowledgebase, wherein the first client posts a question to one of the category discussions in the interactive knowledgebase; the interactive knowledgebase operable to update the category discussion to include the question, the interactive knowledgebase further operable to send an electronic mail message to at least one of the second clients, the at least one second client operable to send a response to the question via the electronic mail client, the response routed to the first client and the interactive knowledgebase, the interactive knowledgebase operable to update the category discussion with the reply, the interactive knowledgebase further operable to permit a third client computer to access the response.

19. The system of claim 18, wherein the category discussion is arranged by threads.

20. The system of claim 18, wherein each category of the interactive knowledgebase has a discussion group.

21. The system of claim 18, wherein at least one of the second users could further select to serve as a mentor for a particular category.

22. A method for updating a category discussion group at a server comprising:
   receiving a question from a first user currently participating in the discussion group, the discussion group associated with one or more categories of information, the discussion group comprising a plurality of questions and answers associated with the category of information, the category of information also associated with at least one informational item;
   adding the question to the discussion group;
   formatting an electronic mail message containing the question;
   sending the question to a select group of users not currently participating in the discussion group via electronic mail, wherein at least one of the select group of users can select to serve as one of a plurality of expert types for at least one category of information, the plurality of expert types including a subject matter expert that may receive the question associated with the at least one category of information and submit the answer to the server, the plurality of expert types also including a subject master that may receive the question associated with the at least one category of information, submit the answer to the server, and remove information from the at least one category of information in the discussion group;
   receiving an answer from one or more of the select group of users;
   updating the discussion group with the answer to facilitate access to the answer by a user other than the first user or the select group of users; and
   forwarding the response to the first user using electronic mail.

23. The method of claim 22, wherein at least one of the select group of users could further select to serve as a mentor for a particular category.

24. The method of claim 22, wherein the select users receives the question without having to access the interactive knowledgebase.

25. A server comprising:
   an interactive database comprising a plurality of informational items, each informational item associated with one or more categories of information, the database also comprising a discussion group associated with one or more categories of information, the discussion group comprising at least one question and answer associated with the category of information, at least one of the answers submitted in response to a question and communicated to the database by a first client, wherein a user associated with the first client can select to serve as one of a plurality of expert types for at least one category of information, the plurality of expert types including a subject matter expert that may receive the question associated with the at least one category of information and submit the answer to the interactive database, the plurality of expert types also including a subject master that may receive the question associated with the at least one category of information, submit the answer to the interactive database, and remove information from the at least one category of information in the interactive database;

an information page builder operable to receive a request for a category of information from a second client, the information page builder also operable to automatically construct an information page using informational items stored in the interactive database and based on the second client's request for the category of information; and the database further operable to receive informational items from the second client, associate the informational items received from the second client with one or more categories of information, and store the informational items.

26. The server of claim 25, wherein the interactive database is operable to send a posted question in the discussion group to certain expert users and wherein the expert users may read and respond to those questions without accessing the database.

27. The server of claim 25, wherein the interactive database is further operable to receive comments about informational items from the second client.

28. The server of claim 27, wherein the interactive database is further operable to associate informational items with received comments about informational items and to store the comments.

29. A client computer comprising:
a web browser operable to receive a request for a category of information from a user, each category associated with one or more informational items and a plurality of questions and answers;
an interface operable to communicate the request to a server, the server comprising:
an interactive database comprising a plurality of informational items, each informational item associated with one or more categories of information, the database also comprising a discussion group associated with one or more categories of information, the discussion group comprising at least one question and answer associated with the category of information, at least one of the answers submitted in response to a question and communicated to the database by a second client, wherein a second user associated with the second client can select to serve as one of a plurality of expert types for at least one category of information, the plurality of expert types including a subject matter expert that may receive the question associated with the at least one category of information and submit the answer to the interactive database, the plurality of expert types also including a subject master that may receive the question associated with the at least one category of information, submit the answer to the interactive database, and remove information from the at least one category of information in the interactive database;

an information page builder operable to receive the request for a category of information, the information page builder also operable to automatically construct an information page using informational items stored in the interactive database and based on the request for the category of information; and the database further operable to receive informational items from the client, associate the informational items received from the client with one or more categories of information, and store the informational items; and the interface also operable to receive the information page from the server, the interface further operable to communicate informational items associated with one or more categories of information to the server.

30. The client computer of claim 29, wherein the web browser is operable to receive comments about informational items from the user, and wherein the interface is operable to communicate the comments to the database.

31. The client computer of claim 29, wherein the interactive database is operable to send a posted question in the discussion group to certain expert users and the expert users may read and respond to the question, and wherein the interface is further operable to receive the response from the server.

32. A method for supporting a category discussion group comprising:
communicating a question from a first user currently participating in the discussion group to a server, the discussion group associated with one or more categories of information, the discussion group comprising a plurality of questions and answers associated with the category of information, the category of information also associated with at least one informational item, wherein the server is operable to:
add the question to the discussion group;
format an electronic mail message containing the question;
send the question to a select group of users not currently participating in the discussion group via electronic mail, wherein at least one of the select group of users can select to serve as one of a plurality of expert types for at least one category of information, the plurality of expert types including a subject matter expert that may receive the question associated with the at least one category of information and submit the answer to the server, the plurality of expert types also including a subject master that may receive the question associated with the at least one category of information, submit the answer to the server, and remove information from the at least one category of information in the discussion group;
receive an answer from one or more of the select group of users;
update the discussion group with the answer to facilitate access to the answer by a user other than the first user or the select group of users; and
forward the response to the first user using electronic mail; and
receiving the response from the server.

33. The method of claim 32, further comprising communicating comments about informational items to the server, wherein the server is operable to associate informational items with the comments and to store the comments.

34. The method of claim 32, further comprising communicating an informational item to the server, wherein the server is operable to associate the informational item with one or more of the categories of information and to store the informational item.

* * * * *